United States Patent
Luo et al.

(10) Patent No.: US 11,994,286 B2
(45) Date of Patent: May 28, 2024

(54) METHOD FOR INHIBITING HIGH TEMPERATURE CORROSION OF HEAT EXCHANGE SURFACE OF BIOMASS BOILER

(71) Applicant: Zhejiang University, Hangzhou (CN)

(72) Inventors: Zhongyang Luo, Hangzhou (CN); Chunjiang Yu, Hangzhou (CN); Qinhui Wang, Hangzhou (CN); Mengxiang Fang, Hangzhou (CN); Hengli Zhang, Hangzhou (CN); Leming Cheng, Hangzhou (CN)

(73) Assignee: ZHEJIANG UNIVERSITY, Hangzhou (CN)

( * ) Notice: Subject to any disclaimer, the term of this patent is extended or adjusted under 35 U.S.C. 154(b) by 489 days.

(21) Appl. No.: 17/500,360

(22) Filed: Oct. 13, 2021

(65) Prior Publication Data
US 2022/0113022 A1 Apr. 14, 2022

(30) Foreign Application Priority Data
Oct. 13, 2020 (CN) .......................... 202011092817.8

(51) Int. Cl.
*F23B 90/02* (2011.01)
*C23F 15/00* (2006.01)
(Continued)

(52) U.S. Cl.
CPC .............. *F23B 90/02* (2013.01); *C23F 15/00* (2013.01); *F23J 7/00* (2013.01); *F26B 3/04* (2013.01);
(Continued)

(58) Field of Classification Search
CPC ...... C23F 15/00; F23B 90/02; F23G 2209/26; F23G 5/48; F23G 7/10; F23J 7/00;
(Continued)

(56) References Cited

U.S. PATENT DOCUMENTS 4,771,712 A * 9/1988 Engstrom ................. C10L 9/10
110/263
5,561,977 A * 10/1996 Harada ................... C10L 10/04
60/803
(Continued)

FOREIGN PATENT DOCUMENTS

CN 107177397 A 9/2017
FR 2474059 A1 7/1981
(Continued)

OTHER PUBLICATIONS

Chinese Office Action dated May 27, 2021, including English translation, for corresponding Chinese patent Application No. 202011092817.8.
(Continued)

*Primary Examiner* — Michael G Hoang
*Assistant Examiner* — Logan P Jones
(74) *Attorney, Agent, or Firm* — David D. Brush; Westman, Champlin & Koehler, P.A.

(57) ABSTRACT

A method of preventing high temperature corrosion on a heat exchanging surface of a biomass boiler, including: a first feeding step, supplying a first biomass fuel to the boiler; a deposition step, performing combustion on the first biomass fuel during initial operation of the boiler, and forming an inert deposition layer on a surface of a heat exchanger of the boiler; a second feeding step, supplying a second biomass fuel different from the first biomass fuel to the boiler; and a normal combustion step, performing combustion on the second biomass fuel. A direct contact of an alkali metal chloride with a metal pipe wall is prevented by forming an inert deposition layer on the surface of the heat exchanger of the boiler in the deposition step, thereby establishing a physical barrier between the heat exchanging surface and the
(Continued)

alkali metal chloride to prevent corrosion on the metal pipe wall.

4 Claims, 3 Drawing Sheets

(51) Int. Cl.
    *F22B 37/02*     (2006.01)
    *F23G 5/48*     (2006.01)
    *F23G 7/00*     (2006.01)
    *F23J 7/00*     (2006.01)
    *F26B 3/04*     (2006.01)
    *F28F 19/02*     (2006.01)
    *G01B 21/08*     (2006.01)
    *C23C 26/00*     (2006.01)

(52) U.S. Cl.
    CPC .............. *F28F 19/02* (2013.01); *G01B 21/08* (2013.01); *F28F 2245/00* (2013.01)

(58) Field of Classification Search
    CPC .. F23M 2900/05001; F26B 3/04; F28F 19/02; F28F 2245/00; F28F 2245/04; G01B 21/08
    See application file for complete search history.

(56) References Cited

U.S. PATENT DOCUMENTS

| | | | | |
|---|---|---|---|---|
| 2009/0038310 A1* | 2/2009 | Aho | ......................... | F22G 3/008 60/657 |
| 2010/0038061 A1* | 2/2010 | Olver | .................... | F28F 19/002 29/890.03 |
| 2012/0074122 A1* | 3/2012 | Olver | ........................ | A21B 2/00 220/573.2 |
| 2014/0299028 A1* | 10/2014 | Kotch | ........................ | C10L 5/04 44/608 |
| 2015/0122161 A1* | 5/2015 | Landon | .................... | C10L 10/04 110/342 |
| 2021/0356125 A1* | 11/2021 | Ravagnani | ................ | F23G 7/10 |

FOREIGN PATENT DOCUMENTS

| | | | |
|---|---|---|---|
| GB | 758399 A | * 10/1956 | |
| WO | WO-2014192313 A1 | * 12/2014 | .............. F22B 21/00 |

OTHER PUBLICATIONS

Zhang Hengli, "Mechanism study on ash deposition and its inhibition on heating surfaces of biomass combustion" Chinese Thesis Title: Research on Deposit Formation and Inhibition Mechanism on Heating Surface of Biomass Combustion Process, May 2020.

\* cited by examiner

METHOD FOR INHIBITING HIGH TEMPERATURE CORROSION OF HEAT EXCHANGE SURFACE OF BIOMASS BOILER

TECHNICAL FIELD

The present invention relates to the technical field of biomass direct combustion power plant, and more specifically to a method of preventing high temperature corrosion on a heat exchanging surface of a biomass boiler.

BACKGROUND ART

With rapid development of modern industry, fossil energy resources are increasingly scarce. As a type of renewable energy resource, biomass energy has advantages of abundant storage and pollution-free usage, and has been widely considered to be one of the ways to address future energy crisis. Biomass energy resources are extremely abundant in China, national annual production of crop straws reaches about 0.7 billion tons including 0.3 billion tons used as fuel and other portions used as papermaking raw materials and livestock feed, in which 0.3 billion crop straws used as fuel are equivalent to about 0.15 billion tons of standard coal.

In China, fuel resources available for biomass direct combustion power generation are mainly straw biomass. The straw biomass features in high contents of alkali elements and chlorine elements. During biomass combustion, alkali metal (e.g. potassium) and chlorine can be released into the gas phase, resulting in severe deposition of alkali metal chloride (e.g., potassium chloride) generated on the heat exchanging surface of boiler, especially on a superheater. Since a high temperature corrosion rate of a metal pipe wall of the heat exchanging surface is greatly increased in the presence of alkali metal chloride, more severe corrosion problems tend to happen in a biomass direct combustion power plant compared to a coal-fired power plant, which affects normal operation of the boiler. The main substances that cause high temperature corrosion of the metal pipe wall of the heat exchanging surface are alkali metal chlorides. Gaseous alkali metal chloride in flue gas may condense on the surface of the heat exchanger to form deposits, which are generally dense and in sufficient contact with the metal pipe wall and further lead to solid phase corrosion or liquid phase corrosion due to the presence of a phase change process.

Therefore, there is a need for a boiler combustion method that can prevent the metal pipe wall of the boiler using biomass as fuel from corrosion.

SUMMARY OF THE INVENTION

Regarding the deficiencies in the prior art, an objective of the present invention is to provide a method of preventing high temperature corrosion on the heat exchanging surface of the biomass boiler.

The method of preventing high temperature corrosion on the heat exchanging surface of the biomass boiler provided by the present invention includes:
 a first feeding step: supplying a first biomass fuel to the boiler;
 a deposition step: performing combustion on the first biomass fuel during initial operation of the boiler, and forming an inert deposition layer on the surface of heat exchanger of the boiler;
 a second feeding step: supplying a second biomass fuel different from the first biomass fuel to the boiler; and
 a normal combustion step: performing combustion on the second biomass fuel.

According to the above technical solutions, a direct contact of the alkali metal chloride with the metal pipe wall is prevented by forming an inert deposition layer on the surface of the heat exchanger of the boiler in the deposition step, thereby establishing a physical barrier between the surface of the heat exchanger of the boiler and the alkali metal chloride to effectively solve the problem of preventing corrosion in the metal pipe wall of the boiler.

Preferably, in the first feeding step, the first biomass fuel is a mixture of kaolin and the second biomass fuel.

According to the above technical solutions, by using the first biomass fuel as the mixture of kaolin and the second biomass fuel in the first feeding step, chemical reactions between kaolin, flying ashes and alkali metal chloride in the combustion process reduce the content of the alkali metal chloride in the gas phase, while the generated calcium chloride and other substances have a competitive relationship with the deposition process of the alkali metal chloride on the surface of the heat exchanger of the boiler, thereby reducing the content of the alkali metal chloride in the deposits on the surface of the heat exchanger of the boiler, generating calcium sulfate and other substances being inert at high temperatures in the deposition at the same time, and further mitigating corrosion caused by the alkali metal chloride on the surface of the heat exchanger of the boiler.

Preferably, in the first feeding step, the chlorine content of biomass in the first biomass fuel is below 0.2%.

According to the above technical solutions, biomass fuels with low chlorine content can prevent highly concentrated enrichment of the alkali metal chloride during an initial period of deposition, and thus, by setting the chlorine content of biomass in the first biomass fuel in the first feeding step to be below 0.2%, inert substances such as calcium carbonate, silica, potassium sulfate, and calcium silicate become main components of the deposits, so that the inert deposition layer formed in the deposition step and tightly on the surface of the heat exchanger of the boiler provides a physical barrier for the surface of the heat exchanger of the boiler, which can continue to prevent direct contact of the alkali metal chloride with the surface of the heat exchanger of the boiler after switching to normal high alkali and high chlorine biomass fuel in order to prevent corrosion.

Preferably, in the first feeding step, a ratio of mass of kaolin in the first biomass fuel to the total mass of alkali metal and chlorine elements is from 2:5 to 6:5.

According to the above technical solutions, by further setting the ratio of mass of kaolin in the first biomass fuel to the total mass of alkali metal and chlorine elements as 2:5 to 6:5 in the first feeding step, corrosion of alkali metal on the surface of the heat exchanger of the boiler can be better mitigated. That is, the inventors have concluded that a better corrosion prevention effect can be produced when the ratio of mass of kaolin to the total mass of alkali metal and chlorine elements is from 2:5 to 6:5 after a large number of experiments.

Preferably, in the first feeding step, the first biomass fuel is mixed with kaolin and biomass that has a chlorine content below 0.2%.

According to the above technical solutions, by mixing the first biomass fuel with kaolin and biomass that has a chlorine content below 0.2% in the first feeding step and forming the inert deposition layer in the deposition step, the physical barrier is provided for the surface of the heat exchanger of the boiler, which is effective to prevent direct contact of the alkali metal chloride with the metal pipe wall of the heat exchanger of the boiler and prevents corrosion.

Preferably, the method further includes:

a drying step, performing a drying process on the boiler when the boiler is shut down after the first feeding step or the normal combustion step.

According to the above technical solutions, after the first feeding step or the normal combustion step, a drying process is performed on the boiler, which is effective to prevent the alkali metal chloride in the deposits from penetrating after moisture absorption and directly being in tight contact with the metal pipe wall of the heat exchanger of the boiler to cause further corrosion.

Preferably, the drying step includes at least one of the following processing steps:

an airtight processing step, performing airtight processing on a boiler door of the boiler to prevent the inert deposition layer from absorbing moisture in the air;

a waterproof processing step, coating the heat exchanger with a waterproof material to prevent the inert deposition layer from absorbing moisture in the air; and a purging and drying processing step, supplying gas for drying to an inside of the boiler to purge and dry the moisture adhered to the surface of the inert deposition layer.

According to the above technical solutions, the boiler is placed in a dry environment by the airtight processing step, the waterproof processing step, and the purging and drying processing step, which effectively prevent the alkali metal chloride in the deposits from penetrating after moisture absorption and directly being in tight contact with the metal pipe wall of the heat exchanger of the boiler to cause further corrosion.

Preferably, the initial operation of the boiler is a time range from a starting-up time of the boiler to a time 48 hours after starting-up.

According to the above technical solutions, by setting the initial operation of the boiler as a time range from the starting-up time of the boiler to the time 48 hours after starting-up, timing of performing combustion on the first biomass fuel in the above deposition step is limited, thereby enabling the surface of the heat exchanger of the boiler to be effectively formed with an inert deposition layer and effectively prevent corrosion on the metal pipe wall of the boiler.

Preferably, the method further includes a detection step for detecting a thickness of the inert deposition layer after the deposition step, and the second feeding step is performed after the detection step is completed.

According to the above technical solutions, by setting the detection step after the deposition step and performing the second feeding step after the detection step is completed, successful generation of the inert deposition layer is guaranteed and then a next step is performed, which effectively increases a feasible rate and a success rate of the method for preventing high temperature corrosion on the heat exchanging surface of the biomass boiler provided by the present invention, and ensures effective solution to the corrosion problem on the surface of the heat exchanger of the boiler.

Preferably, a mass percentage of the kaolin in the first biomass fuel is variable during feeding in the first feeding step.

According to the above technical solutions, by setting a variable mass percentage of the kaolin in the first biomass fuel during feeding in the first feeding step, a mass percentage of the kaolin in the first biomass fuel can be flexibly selected in a range to effectively increase feasibility of the method.

BRIEF DESCRIPTION OF THE DRAWINGS

Other features, objectives, and advantages of the present invention will become more apparent upon reading the detailed description of non-limiting embodiments with reference to the following drawings.

DETAILED DESCRIPTION

The present invention will be described in detail below with reference to embodiments. The following embodiments will facilitate a better understanding of the present invention for those skilled in the art, but are not intended to limit the present invention in any way. It should be noted that changes and modifications may be made by those skilled in the art without departing from the inventive concept. These are all within the scope of the present invention.

First Embodiment

Figure 1:
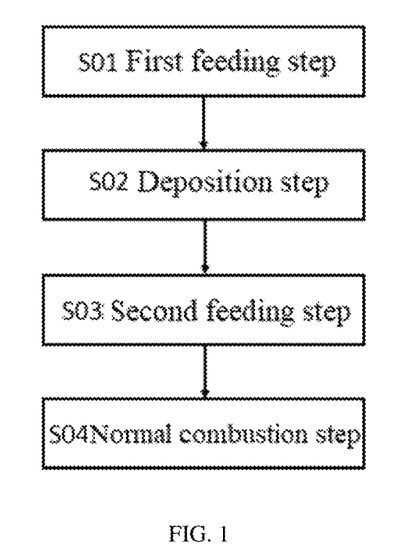
FIG. 1 is a first flow diagram of a method of preventing high temperature corrosion on a heat exchanging surface of a biomass boiler provided by the present invention.

FIG. 1 is a first flow diagram of a method of preventing high temperature corrosion on a heat exchanging surface of a biomass boiler provided by the present invention. As shown in FIG. 1, the method includes the following steps.

Step S01: a first feeding step, supplying a first biomass fuel to a boiler.

Specifically, the boiler described above is a biomass boiler using biomass energy as fuels, including a biomass steam boiler, a biomass hot water boiler, a biomass hot air boiler, a biomass heat-conducting oil boiler, a vertical biomass boiler, and a horizontal biomass boiler. The first biomass fuel can establish a physical barrier between a metal pipe wall of a heat exchanger of the boiler and an alkali metal chloride during combustion, thereby preventing direct contact of the alkali metal chloride with the metal pipe wall to prevent corrosion on a heat exchanging surface of the boiler. In the first feeding step S01, the first biomass fuel is supplied to the boiler. After combustion of the first biomass fuel, the physical barrier can be established between the surface of the heat exchanger of the boiler and the alkali metal chloride to effectively prevent corrosion on the surface of the heat exchanger of the boiler.

Step S02: a deposition step, performing combustion on the first biomass fuel during initial operation of the boiler, and forming an inert deposition layer on the surface of the heat exchanger of the boiler.

Specifically, combustion is performed on the first biomass fuel during initial operation of the boiler. According to the above-described characteristics with respect to the first biomass fuel, the inert deposition layer formed on the surface of the heat exchanger of the boiler during combustion of the first biomass fuel can provide the physical barrier for the metal pipe wall of the heat exchanger of the boiler, so that direct contact of the alkali metal chloride with the metal pipe wall is constantly prevented to prevent corrosion.

Step S03: a second feeding step, supplying a second biomass fuel different from the first biomass fuel to the boiler.

Specifically, in the second feeding step S03, the second biomass fuel is different in type from the first biomass fuel and can be a normal biomass fuel, so that it may be unnecessary to worry about the corrosion on the surface of the heat exchanger of the boiler, which cannot be caused by the combustion of the second biomass fuel.

Step S04: a normal combustion step, performing combustion on the second biomass fuel.

Specifically, in the normal combustion step S04, combustion is performed on the second biomass fuel, which is different from the first biomass fuel, for normal operation of the boiler.

In the present embodiment, as to the method of preventing high temperature corrosion on the heat exchanging surface of the biomass boiler provided by the present invention, a form in which the method includes the first feeding step S01, the deposition step S02, the second feeding step S03 and the normal combustion step S04 is described in detail, but the present invention is not limited thereto. Any method of preventing high temperature corrosion on the heat exchanging surface of the biomass boiler including the first feeding step S01, the deposition step S02, the second feeding step S03 and the normal combustion step S04 are within the scope of the present invention and fall within the scope of the present invention.

Second Embodiment

Based on the first embodiment, a method of preventing high temperature corrosion on the heat exchanging surface of the biomass boiler provided by the present invention is the same as the first embodiment, and the same description is omitted, unless specifically stated otherwise.

Different from the first embodiment, in the first feeding step S01, the first biomass fuel is a mixture of kaolin and the second biomass fuel.

Specifically, in the first feeding step S01, kaolin is used as additives to be mixed with the second biomass fuel for feeding; in the deposition step S02, due to the mixed feeding of kaolin and the second biomass fuel, a physical barrier is established between the metal pipe wall of the heat exchanging surface and the alkali metal chloride, thereby effectively preventing direct contact of the alkali metal chloride with the metal pipe wall to prevent corrosion. More specifically, on the one hand, chemical reactions between kaolin, flying ashes and alkali metal chloride in the combustion process reduce the content of the alkali metal chloride in the gas phase; on the other hand, the calcium chloride and other substances generated after a series of complex reactions have a competitive relationship with a deposition process of the alkali metal chloride on the wall of the heat exchanger, thereby reducing the content of the alkali metal chloride in the deposits on the metal pipe wall, generating calcium sulfate and other substances being inert at high temperatures in the deposition at the same time, and further mitigating corrosion of alkali metal. In the second feeding step S03 and the normal combustion step S04, even if combustion is normally performed on the second biomass fuel, there is no need to worry about the corrosion problem.

As a preferred embodiment of the present embodiment, in the deposition step S02, the initial operation of the boiler is a time range from a starting-up time of the boiler to a time 48 hours after starting-up. According to the present embodiment, efficient formation of the inert deposition layer on the surface of the heat exchanger of the boiler is ensured, thereby increasing a success rate of solution implementation.

As a preferred embodiment of the present embodiment, during a feeding process in the first feeding step S01, when kaolin is used as additives to be mixed with the first biomass fuel, a feeder can be directly used to constantly add the kaolin. According to the preferred embodiment described above, operation of an operator is facilitated, and usage amount of kaolin can be flexibly and reasonably adjusted as needed.

As a preferred specific embodiment of the present embodiment, a mass percentage of the kaolin in the first biomass fuel is variable during feeding in the first feeding step S01. According to the preferred embodiment described above, the amount of kaolin is enabled to be selected with flexibility as required in reality, thereby further increasing feasibility and flexibility of the method.

As a preferred embodiment of the present embodiment, in the first feeding step S01, a ratio of mass of kaolin in the first biomass fuel to the total mass of alkali metal and chlorine elements ranges from 2:5 to 6:5.

Next, validity of the implementation solution provided by the present embodiment is verified by specific experimental examples.

Figure 2:
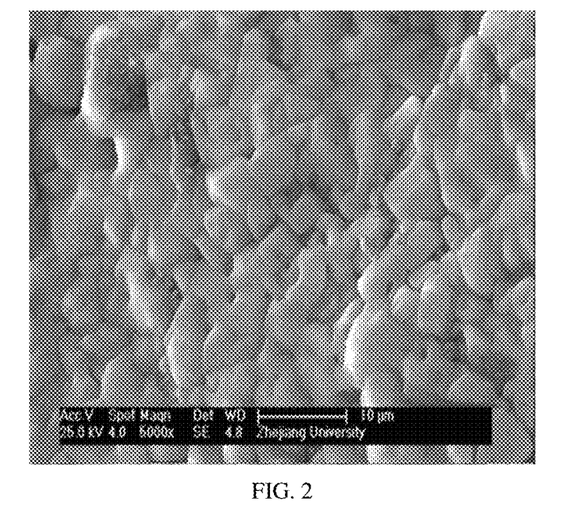
FIG. 2 is a schematic diagram of a first deposition micro-shape electron micrograph.

FIG. 2 is a schematic diagram of a first deposition micro-shape electron micrograph. In a biomass power plant performing combustion on a biomass fuel with contents of 0.69% potassium (K) and 0.89% chlorine (Cl), the schematic diagram of the deposition micro-shape electron micrograph on a high-temperature superheater is shown in FIG. 2, in which highly purified alkaline metal chloride (KCl) is on a surface.

After a new boiler is started up or the boiler is shut down for cleaning deposits, when the boiler is started again, the kaolin (the mass percentage of the kaolin in the biomass fuel is respectively 0.3%, 0.6%, 0.9%, 1.2%, 1.8%, and 2.4%) is added in different proportions and is mixed with the first biomass fuel for feeding in the first feeding step S01.

Figure 3:
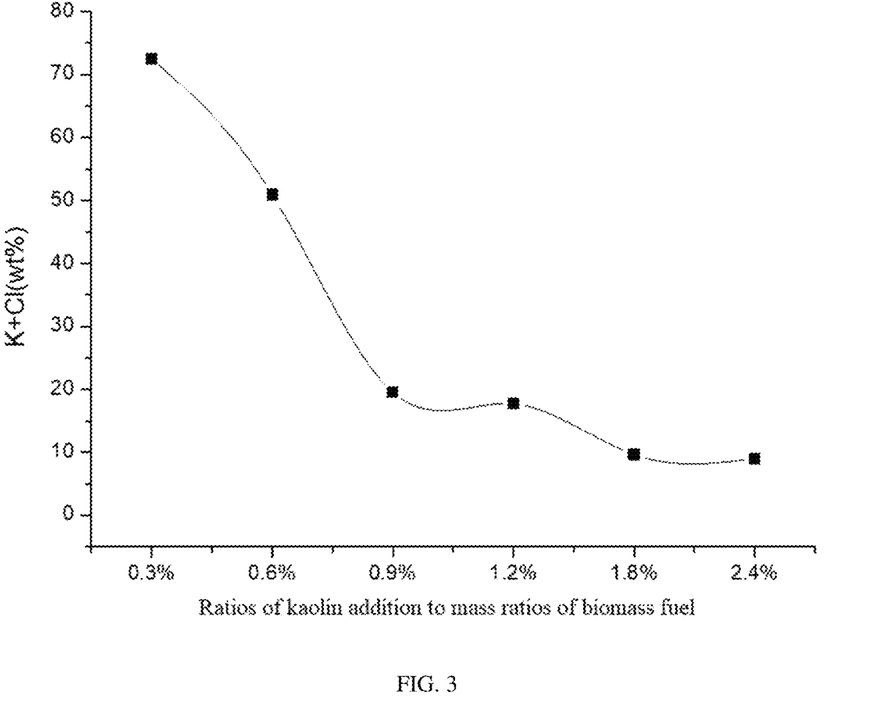
FIG. 3 is a schematic diagram illustrating contents of alkali metal chloride in deposition on a surface of a high-temperature superheater at different ratios of kaolin addition to mass ratios of biomass fuel.

FIG. 3 is a schematic diagram illustrating contents of alkali metal chloride in deposition on a surface of a high-temperature superheater at different ratios of kaolin addition to mass ratios of biomass fuel. After 15 hours, elemental composition of deposition on the surface of the high-temperature superheater is detected, in which the content of the alkali metal chloride (KCl) in the deposition is shown in FIG. 3.

As shown in FIG. 3, the added kaolin significantly prevents enrichment of the alkali metal chloride in the deposition, and a mass ratio of the alkali metal chloride (KCl) to the deposition gradually decreases as the added amount of kaolin increases. The content of the alkali metal chloride (KCl) is less than 20% after the added amount of kaolin is greater than 0.9%. The added amount of kaolin further increases after 0.9% kaolin is added, and the alkali metal chloride (KCl) slowly decreases.

In the present embodiment, the added amount of 0.9% is a more economical added amount of kaolin. The added amount of kaolin can be adjusted according to parameters and the contents of potassium (K) and chlorine (Cl) in the fuel for other biomass boilers.

It can be verified by the above-described experiments that the addition of kaolin can significantly reduce the content of alkali metal chloride (KCl) in the deposition, and form a layer of inert deposition layer on the surface of the heat exchanger of the boiler. Then the deposition layer establishes an effective physical barrier, thereby preventing direct contact of the alkali metal chloride (KCl) generated in subsequent operations with the metal pipe wall of the heat exchanger to effectively prevent the occurrence of corrosion.

In the present embodiment, as to the method of preventing high temperature corrosion on the heat exchanging surface of the biomass boiler provided by the present invention, a form in which the first biomass fuel is a mixture of kaolin and the second biomass fuel in the first feeding step S01 is described in detail, but the present invention is not limited thereto. Any boiler combustion method including that the first biomass fuel in the first feeding step S01 is a mixture of the kaolin and the second biomass fuel is within the scope of the present invention and falls within the scope of the present invention.

Third Embodiment

Based on the first embodiment, a method of preventing high temperature corrosion on the heat exchanging surface of the biomass boiler provided by the present invention is the same as the first embodiment, unless specifically stated otherwise.

Different from the first embodiment, in the first feeding step S01, the chlorine content of biomass in the first biomass fuel is below 0.2%.

Specifically, in the first feeding step S01, the first biomass fuel uses a biomass fuel with low chlorine content; in the deposition step S02, the biomass fuel with low chlorine content can effectively prevent highly concentrated enrichment of the alkali metal chloride during an initial period of deposition according to growth and distribution characteristics of deposition of the alkali metal, especially the alkali metal chloride on the heat exchanging surface, and inert substances such as calcium carbonate, silica, potassium sulfate, and calcium silicate become main components of the deposition, so that the inert deposition layer formed during startup of the boiler and an initial period of stable operation and tightly on the metal pipe wall of the heat exchanging surface provides a physical barrier for the metal pipe wall of the heat exchanger of the boiler, thereby effectively preventing direct contact of the alkali metal chloride with the metal pipe wall. In the second feeding step S03 and the normal combustion step S04, the second biomass fuel is a normal high alkali and high chlorine biomass fuel, which can prevent direct contact of the alkali metal chloride with the metal pipe wall after combustion of the second biomass fuel to constantly prevent corrosion on the surface of the heat exchanger of the boiler.

As a preferred embodiment of the present embodiment, tree branches, tree trunks, wood processing waste, etc. may be selected as the first biomass fuel, and the chlorine content (a mass percentage of chlorine elements in the dry weight of the biomass) thereof is controlled to be below 0.2%. According to the embodiment described above, implementation costs of the method are reduced, and economy and environmental friendliness are improved.

Next, validity of the implementation solution provided by the present embodiment is verified by specific experimental examples.

Figure 4:
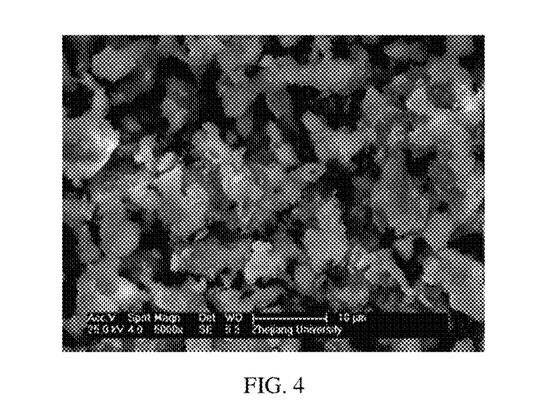
FIG. 4 is a schematic diagram of a first deposition micro-shape electron micrograph.

FIG. 4 is a schematic diagram of a first deposition micro-shape electron micrograph. In the first feeding step S01, the biomass fuel with low chlorine content (mass percentages of K elements and Cl elements in the dry weight of the biomass are 0.61% and 0.09%) is used, and the deposition micro-shape electron micrograph after 15 hours is shown in FIG. 4. From the deposition micro-shape electron micrograph as shown in FIG. 4, it can be seen that deposition shape is different from a case where high chlorine biomass is used for combustion, and the elemental composition of the deposition shows that the content of chlorine (Cl) elements is at a low proportion of only 0.25% while the content of potassium (K) elements is 34.36%. Further, XRD and other means are used to confirm that the alkali metal (K) therein is present in a form of $K_2SO_4$, which has a higher melting point and lower reactivity than the alkali metal chloride (KCl) and does not tend to corrode a metal pipe wall of the superheater.

It can be verified by the above-described experiments that using the biomass fuel with low chlorine content can significantly reduce the content of alkali metal chloride (KCl) in the deposition and form a layer of inert deposition on the surface of the heat exchanger of the boiler. Then the deposition layer establishes an effective physical barrier, thereby preventing direct contact of the alkali metal chloride (KCl) generated in subsequent operations with the metal pipe wall to effectively prevent the occurrence of corrosion.

In the present embodiment, as to the method of preventing high temperature corrosion on the heat exchanging surface of the biomass boiler provided by the present invention, a form in which the chlorine content of biomass in the first biomass fuel in the first feeding step S01 is below 0.2% is described in detail, but the invention is not limited thereto. Any boiler combustion method including that the chlorine content of biomass in the first biomass fuel is below 0.2% is within the scope of the present invention and falls within the scope of the present invention.

With specific explanations of the second embodiment and the third embodiment, unlike traditional technical solutions, the technical solutions provided by the present invention is only required to regulate a deposition behavior of the alkali metal chloride on the surface of the heat exchanger of the boiler during startup of the boiler and an initial period of stable operation, focuses on preventing the direct contact of the alkali metal chloride with the metal pipe wall of the heat exchanging surface, and uses main control methods which are only needed to be performed at an initial period of boiler start-up process, such as the addition of kaolin or the use of low-chlorine biomass fuel as described in the second embodiment and the third embodiment, thereby greatly reducing the costs and improving the economy of the solution.

Fourth Embodiment

Based on the first embodiment, a method of preventing high temperature corrosion on the heat exchanging surface of the biomass boiler provided by the present invention is the same as the first embodiment, unless specifically stated otherwise.

Different from the first embodiment, in the first feeding step S01, the first biomass fuel is mixed with kaolin and biomass that has a chlorine content below 0.2%.

Specifically, the above described embodiments integrates technical means in the second embodiment and the third embodiment, i.e., in the first feeding step S01, a mixture of kaolin and biomass that has a chlorine content below 0.2% is used as the first biomass fuel. Feeding time can be flexibly selected according to actual situations in the field by the present embodiment, in which the use of biomass fuel with low chlorine content and kaolin can be stopped after the inert deposition layer is formed on the pipe wall of the heat exchanger of the boiler in the deposition step S02. The formed inert deposition layer provides a physical barrier for the metal pipe wall of the heat exchanging surface of the boiler, which effectively prevents direct contact of the alkali metal chloride with the metal pipe wall to prevent corrosion.

In the present embodiment, as to the method of preventing high temperature corrosion on the heat exchanging surface of the biomass boiler provided by the present invention, a form in which the first biomass fuel is mixed with kaolin and biomass that has a chlorine content below 0.2% is described in detail, but the invention is not limited thereto. Any boiler combustion method including that the first biomass fuel is mixed with kaolin and biomass that has a chlorine content below 0.2% in the first feeding step S01 is within the scope of the present invention and falls within the scope of the present invention.

Fifth Embodiment

Figure 5:
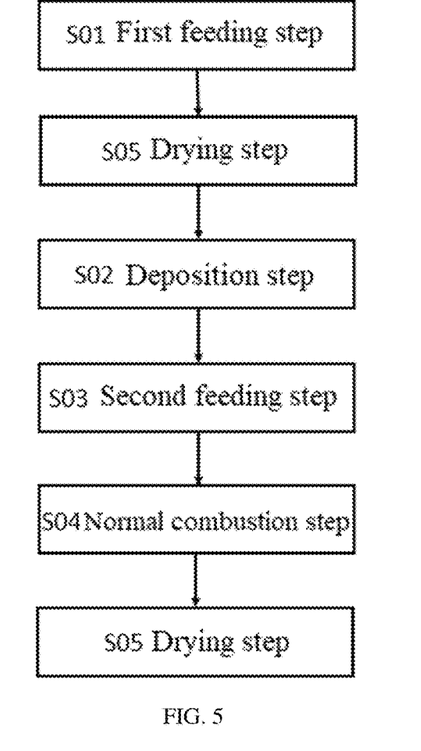
FIG. 5 is a second flow diagram of the method of preventing high temperature corrosion on the heat exchanging surface of the biomass boiler provided by the present invention.

FIG. 5 is a second flow diagram of the method of preventing high temperature corrosion on the heat exchanging surface of the biomass boiler provided by the present invention.

As shown in FIG. 5, based on any one of the first embodiment to the fourth embodiment as described above, a method of preventing high temperature corrosion on the heat exchanging surface of the biomass boiler provided by the present invention is the same as any one of the first embodiment to the fourth embodiment as described above, unless specifically stated otherwise.

Different from the first embodiment to the fourth embodiment, the method further includes the following step.

Step 05: a drying step, performing a drying process on the boiler after the first feeding step S01 or the normal combustion step S04.

Specifically, by setting the drying step S05, the inside of the boiler is effectively maintained dry during the shutdown of the boiler, which prevents the alkali metal chloride in the deposition from penetrating after moisture absorption and directly being in tight contact with the metal pipe wall to cause further corrosion.

As a preferred embodiment, the drying step S05 described above includes at least one of the following processing steps.

Step S05a: an airtight processing step, performing airtight processing on a boiler door of the boiler to prevent the inert deposition layer from absorbing moisture in the air.

Specifically, by the airtight processing step S05a, airtight processing is performed on the boiler door of the boiler, which effectively prevents the inert deposition layer generated in the deposition step S02 from absorbing moisture in the air, so that the inert deposition layer continuously plays a role of establishing a physical barrier between the metal pipe wall of the heat exchanging surface of the boiler and the alkali metal chloride and continuously prevents direct contact of the alkali metal chloride with the metal pipe wall to constantly prevent corrosion.

Step S05b: a waterproof processing step, coating the heat exchanger with a waterproof material to prevent the inert deposition layer from absorbing moisture in the air; and Specifically, by the waterproof processing step S05b, the heat exchanger is coated with the waterproof material to prevent the inert deposition layer generated in the deposition step S02 from absorbing moisture in the air, so that the inert deposition layer continuously plays the role of establishing a physical barrier and continuously prevents direct contact of the alkali metal chloride with the metal pipe wall to constantly prevent corrosion.

Step S05c: a purging and drying processing step, supplying gas for drying to the inside of the boiler to purge and dry the moisture adhered to the surface of the inert deposition layer.

Specifically, by the purging and drying processing step S05c, the inside of the boiler is supplied with gas for drying to purge and dry the moisture adhered to the surface of the inert deposition layer generated in the deposition step S02, so that the inert deposition layer continuously plays the role of establishing a physical barrier and continuously prevents direct contact of the alkali metal chloride with the metal pipe wall to constantly prevent corrosion.

In the present embodiment, as to the method of preventing high temperature corrosion on the heat exchanging surface of the biomass boiler provided by the present invention, a form of the drying step is described in detail, but the invention is not limited thereto. Any boiler combustion method including the drying step described above is within the scope of the present invention and falls within the scope of the present invention.

Sixth Embodiment

Figure 6:
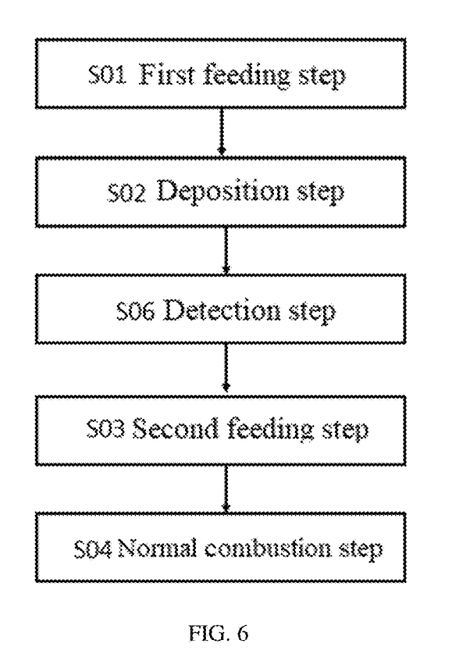
FIG. 6 is a third flow diagram of the method of preventing high temperature corrosion on the heat exchanging surface of the biomass boiler provided by the present invention.

FIG. 6 is a third flow diagram of the method of preventing high temperature corrosion on the heat exchanging surface of the biomass boiler provided by the present invention. As shown in FIG. 6, based on any one of the first embodiment to the fifth embodiment as described above, a method of preventing high temperature corrosion on the heat exchanging surface of the biomass boiler provided by the present invention is the same as any one of the first embodiment to the fifth embodiment as described above, unless specifically stated otherwise.

Different from the first embodiment to the fifth embodiment, the method further includes the following step after the deposition step S02.

Step S06: a detection step for detecting a thickness of the inert deposition layer after the deposition step S02, and the second feeding step S03 is performed after the detection step S06 is completed.

Specifically, by setting the detection step S06 after the deposition step S02, the thickness of the inert deposition layer generated in the deposition step S02 is detected to guarantee effective generation of the inert deposition layer in the deposition step S02, while performing the next step after the detection step S06 is completed effectively increases a feasible rate and a success rate of the method for preventing high temperature corrosion on the heat exchanging surface of the biomass boiler provided by the present invention and ensures effective solution to the corrosion problem on the surface of the heat exchanger of the boiler.

In the present embodiment, as to the method of preventing high temperature corrosion on the heat exchanging surface of the biomass boiler provided by the present invention, a form of the detection step is described in detail, but the invention is not limited thereto. Any boiler combustion method including the detection step described above is within the scope of the present invention and falls within the scope of the present invention.

Specific embodiments of the present invention have been described above. It should be understood that the invention is not limited to the specific embodiments described above and that variations or modifications may be made within the scope of the claims by those skilled in the art without materially affecting the present invention. It should be noted that the embodiments in the present application and the features in the embodiments can be combined at will without conflicts with each other.

The invention claimed is:

1. A boiler combustion method using biomass as fuel, comprising:
   a first feeding step, supplying a first biomass fuel to a boiler, wherein the first biomass fuel is a mixture of kaolin and a second biomass fuel in the first feeding step, a chlorine content of biomass in the first biomass fuel is below 0.2% in the first feeding step, and a ratio of mass of kaolin in the first biomass fuel to a total mass of alkali metal and chlorine elements is from 2:5 to 6:5 in the first feeding step;
   a deposition step, performing combustion on the first biomass fuel during initial operation of the boiler, and forming an inert deposition layer on the a surface of a heat exchanger of the boiler;
   a second feeding step, supplying the second biomass fuel to the boiler; and
   a normal combustion step, performing combustion on the second biomass fuel; and
   a drying step, performing a drying process on the boiler after the first feeding step or the normal combustion step, wherein the drying step includes at least one of the following processing steps:
      an airtight processing step, performing airtight processing on a boiler door of the boiler to prevent the inert deposition layer from absorbing moisture in the air;
      a waterproof processing step, coating the heat exchanger with a waterproof material to prevent the inert deposition layer from absorbing moisture in the air; and
      a purging and drying processing step, supplying gas for drying to an inside of the boiler to purge and dry moisture adhered to the surface of the inert deposition layer.

2. The boiler combustion method using biomass as fuel according to claim 1, wherein initial operation of the boiler is a time range from a starting-up time of the boiler to a time 48 hours after starting-up.

3. The boiler combustion method using biomass as fuel according to claim 1, further comprising:
   a detection step detecting a thickness of the inert deposition layer after the deposition step,
   wherein the second feeding step is performed after the detection step is completed.

4. The boiler combustion method using biomass as fuel according to claim 1, wherein a mass percentage of the kaolin in the first biomass fuel is variable during feeding in the first feeding step.

* * * * *